United States Patent
Huynh et al.

(10) Patent No.: US 9,965,774 B2
(45) Date of Patent: May 8, 2018

(54) PRESENTING ADVERTISEMENTS IN A DIGITAL MAGAZINE BY CLUSTERING CONTENT

(71) Applicant: Flipboard, Inc., Palo Alto, CA (US)

(72) Inventors: David Huynh, San Francisco, CA (US); Kai Ju Liu, Palo Alto, CA (US)

(73) Assignee: Flipboard, Inc., Palo Alto, CA (US)

( * ) Notice: Subject to any disclaimer, the term of this patent is extended or adjusted under 35 U.S.C. 154(b) by 307 days.

(21) Appl. No.: 14/738,236

(22) Filed: Jun. 12, 2015

(65) Prior Publication Data

US 2015/0363407 A1  Dec. 17, 2015

Related U.S. Application Data

(60) Provisional application No. 62/012,250, filed on Jun. 13, 2014.

(51) Int. Cl.
| | | |
|---|---|---|
| *G06F 17/30* | (2006.01) | |
| *G06Q 30/02* | (2012.01) | |
| *H04L 29/08* | (2006.01) | |
| *H04W 4/20* | (2018.01) | |

(52) U.S. Cl.
CPC ... *G06Q 30/0261* (2013.01); *G06F 17/30598* (2013.01); *G06F 17/30705* (2013.01); *G06Q 30/0269* (2013.01); *H04L 67/02* (2013.01); *H04W 4/206* (2013.01)

(58) Field of Classification Search
CPC ............ G06Q 30/0269; G06Q 30/0261; G06F 17/30705; G06F 17/30598; H04L 67/02; H04W 4/206

USPC ......................................... 707/737, 738, 748
See application file for complete search history.

(56) References Cited

U.S. PATENT DOCUMENTS

| | | | | |
|---|---|---|---|---|
| 8,255,948 | B1 * | 8/2012 | Black ............. | H04N 21/234336 |
| | | | | 709/219 |
| 8,554,640 | B1 * | 10/2013 | Dykstra ............... | G06Q 10/101 |
| | | | | 705/14.49 |
| 8,739,207 | B1 * | 5/2014 | Black ............. | H04N 21/234336 |
| | | | | 725/35 |
| 9,378,295 | B1 * | 6/2016 | Marra ............... | G06F 17/30705 |
| 2007/0192703 | A1 | 8/2007 | Unz | |
| 2009/0241015 | A1 | 9/2009 | Bender et al. | |
| 2011/0065082 | A1 | 3/2011 | Gal et al. | |

(Continued)

OTHER PUBLICATIONS

PCT International Search Report and Written Opinion, PCT Application No. PCT/US2015/035590, dated Sep. 8, 2015, eleven pages.

*Primary Examiner* — Phong H Nguyen
(74) *Attorney, Agent, or Firm* — Fenwick & West LLP

(57) ABSTRACT

A digital magazine server creates cover pages identifying relevant content items relevant to a user. Candidate feeds of content items are identified from various sources, with clusters of content items generated from content items included in various candidate feeds. Content items in various clusters are scored, and one or more content items are selected from each cluster. The selected content items are placed in a consolidated feed, which is used to create a cover page for viewing by a user of the digital magazine server. One or more advertisements may be included in a candidate feed, with the digital magazine server specifying a position within the cover page in which a content item associated with a candidate feed including an advertisement is presented.

20 Claims, 5 Drawing Sheets

(56) References Cited

U.S. PATENT DOCUMENTS

| | | | |
|---|---|---|---|
| 2011/0289088 A1* | 11/2011 | Yarin | G06F 17/30781 |
| | | | 707/738 |
| 2012/0143911 A1 | 6/2012 | Liebald et al. | |
| 2013/0347057 A1 | 12/2013 | Hurwitz et al. | |
| 2014/0130182 A1* | 5/2014 | Yackanich | G06F 21/60 |
| | | | 726/27 |
| 2014/0372873 A1* | 12/2014 | Leung | G06F 17/3089 |
| | | | 715/243 |
| 2015/0213492 A1* | 7/2015 | Aleksandrovsky | |
| | | | G06Q 30/0255 |
| | | | 705/14.53 |

* cited by examiner

PRESENTING ADVERTISEMENTS IN A DIGITAL MAGAZINE BY CLUSTERING CONTENT

CROSS REFERENCE TO RELATED APPLICATIONS

This application claims the benefit of U.S. Provisional Application No. 62/012,250, filed Jun. 13, 2014, which is incorporated by reference in its entirety.

BACKGROUND

This disclosure generally relates to presenting content to a user of a digital magazine server, and more specifically to presenting content including advertisements to the user.

Digital distribution channels disseminate content including text, images, audio, links, videos, and interactive media (e.g., games, collaborative content), and a combination thereof. Although users of online systems can access more content than before, the broad selection available can overwhelm users. Various conventional techniques focus primarily on helping a user discover a particular content item associated with a content provider, such as an advertiser. However, as the number content providers vying for a user's attention increases, the likelihood that a user discovers a particular content item decreases using conventional techniques.

SUMMARY

A digital magazine server retrieves content from one or more sources and generates a personalized, customizable digital magazine for a user based on the retrieved content. The digital magazine server presents customized cover pages (e.g., personalized "Cover Stories," news stories, technology stories, or other personalized collections) to its users including information describing content items retrieved for presentation to the users. To create a customized cover page, the digital magazine server identifies content items from various candidate feeds. A candidate feed includes content items selected by a user, recommended by the digital magazine server based on the user's inferred interests, content items retrieved from social networking systems associated with the user, content items retrieved from sources external to the digital magazine server, and targeted content based on user characteristics. Additionally, the digital magazine server may include one or more advertisements in a candidate feed. However, to prevent advertisements included in a candidate feed from competing with other content items included in the candidate feed, the digital magazine server generates a set of content including an advertisement and one or more additional content items for presentation prior to the advertisement. For example, a set of content includes an advertisement and a content item associated with an advertiser associated with the advertisement, the content item is initially presented in the candidate feed, and when a user navigates from the content item in the set to a subsequent content item, the advertisement is presented. This allows an advertiser to provide context associated with the advertisement to increase likelihood of a user interacting with the advertisement.

Candidate content items are retrieved from the candidate feeds. The candidate content items are sorted into similar groups of content items, with content items in each group ranked. Content items having at least a threshold position in the group-specific ranking are selected from each group of content items. Content items may be selected from each group based on relevance of the content items to the user or similarity between a content item and other content items in the group. The selected content items are included in a consolidated feed used to identify content items described by a cover page presented to the user. The cover page includes information identifying various groups of content items, allowing a user to view content associated with various groups. Sorting content items into various groups and selecting content items from the various groups ensures that the cover page presents information describing a diverse range of content items.

When generating a cover page, the digital magazine server may identify an ad group including content in which advertisements or content associated with a specific topic are presented. The ad group is included in a common location within cover pages generated for presentation to multiple users of the digital magazine server. For example, each user of the digital magazine server eligible to be presented with an advertisement is presented with a cover page including the ad group in a common location relative to other groups identified by the cover pages. When a user selects the ad group, content from a candidate feed associated with the ad group, which includes one or more advertisements and other content items, is presented to the user. The ad group presented to a user may be selected based at least in part on a geographic location associated with a client device, interactions by the user with other content items or consolidated feeds, or other suitable information. Additionally, the digital magazine server may enforce a frequency cap associated with the user specifying a maximum number of times the ad group or a content item included in the ad group is presented to the user during a specified time interval.

Further, the ad group may be sponsored by an advertiser or other entity, so the digital magazine server receives revenue from the advertiser or other entity in exchange for presenting the ad group to the user. In some embodiments, the digital magazine server may identify the ad group as sponsored when it is presented to the user. For example, the digital magazine server may identify an ad group as being sponsored by an advertiser or other entity based at least in part on one or more content items included in the ad group being an advertisement provided by the advertiser or other entity. In some embodiments, the digital magazine server receives the sponsored ad group and information specifying one or more settings for displaying a content item included in the sponsored ad group. Example settings include a specified content region or location of a display device of a client device for displaying content items associated with the ad group, a number of times a content item from the ad group is presented to a user within a specified time interval, and an order in which content items from the ad group are presented relative to each other. When an advertiser compensates the digital magazine server for presenting the ad group, the advertiser may specify a specific content item for presentation on a cover page via the ad group, allowing an advertiser to promote a specific content item. For example an advertiser for sports apparel may promote a soccer cleat as the cover page for an ad group including content items associated with the 2014 FIFA World Cup Brazil™. A cover page may include multiple content items or a page that presents one content item from a group of content items in specified sequence.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital server application generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each includes content having a common characteristic (e.g., content obtained from a particular source, content having particular key words, content associated with particular topics). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

System Architecture

Figure 1:
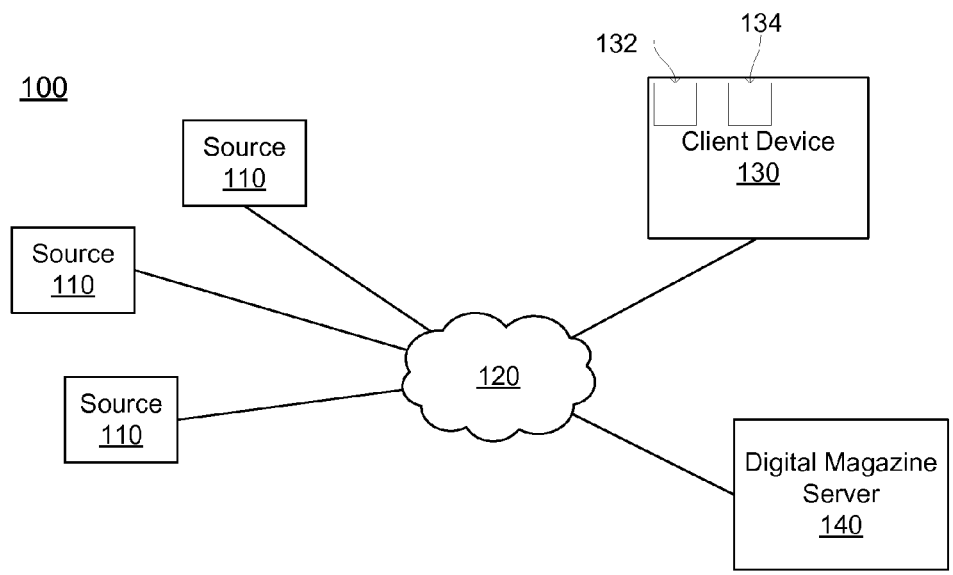
FIG. 1 is a block diagram of a system environment in which a digital magazine server operates, in accordance with an embodiment.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine servers 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content elements such as text, images, video, interactive media, links, and a combination thereof.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.1, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 110 is a conventional computer system, such as a desktop or a laptop computer. Alternatively, the client device 130 may be a device having computer functionality, such as a personal digital assistant (PDA), a mobile telephone, a smartphone or another suitable device. In one embodiment, the client device 130 executes an application allowing a user of the client device 110 to interact with the digital magazine server 140. For example, an application executing on the client device 130 communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 110, such as IOS® or ANDROID™. While FIG. 1 shows a single client device 130, in various embodiments, any number of client devices 130 may communicate with the digital magazine server 140. Different client devices may have different characteristics such as different processing capabilities, different connection speeds with the digital magazine server 140 over the network 120, and different device types (e.g., make, manufacture, version).

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 130 have display devices 132 with different display areas, different resolutions, different aspect ratios, different display dimensions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. Additionally, the client device may include multiple input devices 134 in some embodiments. Inputs received via the input device 134 may be processed by a digital magazine application associated with the digital magazine server 140 and executing on the client device 130 to allow a client device user to interact with content items presented by the digital magazine server 140.

The digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

Figure 2:
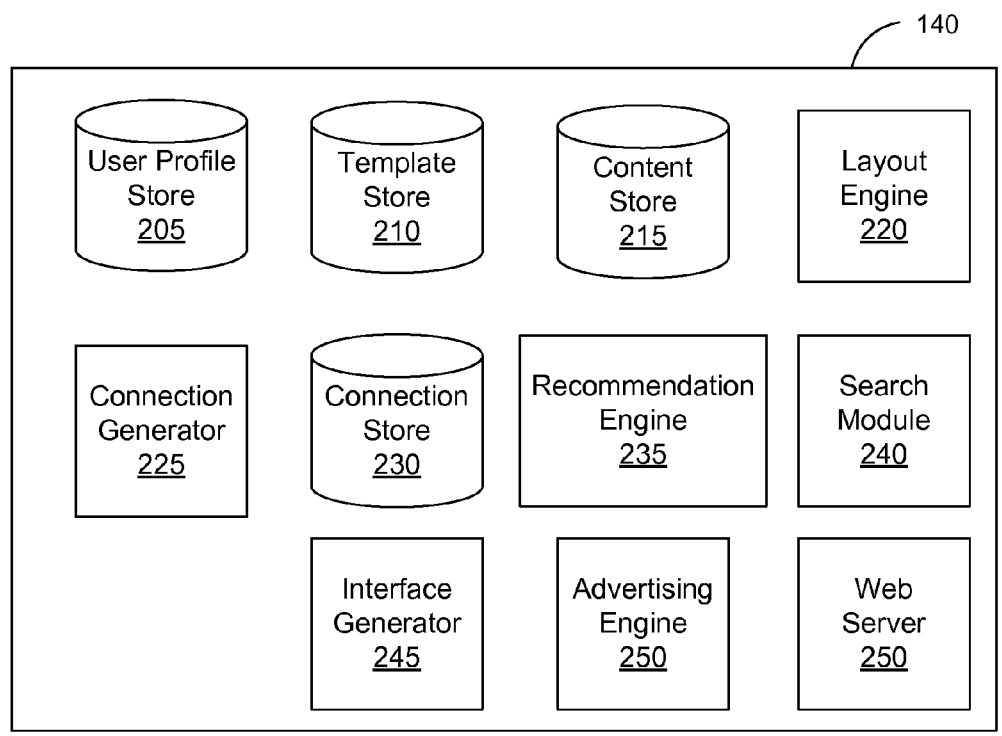
FIG. 2 is a block diagram of a digital magazine server, in accordance with an embodiment.

FIG. 2 is a block diagram of an architecture of the digital magazine server 140. The digital magazine server 140 shown in FIG. 2 is a computing device that includes a user profile store 205, a template store 210, a content store 215, a layout engine 220, a connection generator 225, a connection store 230, a recommendation engine 235, a search module 240, an interface generator 245, an advertising engine 250, and a web server 255. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding social networking system user. Examples of information stored in a user profile include biographic, demographic (e.g., age, gender, occupation, education, socioeconomic status), and other types of descriptive information, such as gender, hobbies or preferences, location (e.g., residence, birthplace, check-in locations), or other suitable information. The user profile store 205 may also include information for accessing one or more social networking systems or other types of sources (e.g., a user name, a password, an access code) that a user has authorized the digital magazine server 140 to access. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred. Content items a user previously interacted with may be retrieved by the digital magazine server 140 using the content item identifiers in the user's user profile, allowing the digital magazine server 140 to recommend content items to the user based on content items with which the user previously interacted.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more content regions or slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a 110 to specify the format of pages presenting content items received from the 110. For example, an online retailer is associated with a page template to allow the online retailer to present content items via the digital magazine server 140 with a specific organization.

The content store 215 stores objects that represent various types of content. For example, the content store 215 stores content items received from one or more sources 110 within a threshold time of a current time. Examples of content items stored by the content store 215 include a page post, a status update, a photograph, a video, a link, an article, video data, audio data, a check-in event at a location, or any other type of content. A user may specify a section including content items having a common characteristic, and the common characteristic is stored in the content 215 store along with an association with the user profile or the user specifying the section. In one embodiment, the content store 215 includes information identifying candidate content items for recommendation to a user. In one embodiment, the content store 215 may also store characteristic vectors representing a combination of interests for a user or clusters of interests or content items for a user determined by the recommendation engine 235.

The layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a first and a second user by analyzing the first user's interactions with content items posted by the second user, whether the content item is posted using the digital magazine server 140 or on another social networking system. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230 and generates a list of content items to recommend to the user. In one embodiment, the recommendation engine 235 also generates one or more characteristic vectors, as further described below in conjunction with FIG. 4. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a 110 from which a content item was received, time when a content item was retrieved, and subject matter of a content item. Examples of characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

The recommendation engine 235 may identify content items for inclusion in a cover page that describes content items included in one or more sections of a digital magazine. In one embodiment, a cover page includes information describing one or more content items included in various sections of the digital magazine. To improve user interaction with the digital magazine server 140, the recommendation engine 235 may diversify the content items included in a the cover page. Additionally, the recommendation engine 235 may work in conjunction with the advertising engine 250 to include one or more ad groups in a cover page. An ad group may include one or more advertisements and content items associated with a topic. If a user accesses the ad group, the user is presented with one or more content items associated with the ad group. For example, the ad group is associated with a feed of content items associated with a topic and includes one or more advertisements associated with the topic. In another example, the ad group is sponsored by an advertiser or other entity, and includes one or more content items provided by the advertiser or other entity that the advertiser or other entity would like to promote to a user of the digital magazine server 140. When an ad group is included in a cover page, information describing the ad group, such as a content from the ad group, is presented in a specific location of the cover page, so that each user presented with a cover page including the ad group is presented with a cover page that presents the ad group in a common location relative to information presented by the cover page identifying other sections of the digital magazine. The specific location in which content associated with an ad group is presented within a cover page may be determined based on prior interactions between digital magazine server users and content items presented in various locations within previously presented cover pages or any other suitable information. An ad group included in a cover page presented to a user may be selected based at least in part on a geographic location associated with a client device, interactions by the user with other content items or consolidated feeds, or any other suitable information. Presentation of an ad group is further described below in conjunction with FIGS. 5-6B.

As further described below in conjunction with FIG. 5, the recommendation engine 235 identifies candidate feeds each including one or more content items. The content items in a candidate feed may be retrieved from various sources 110, such as a social networking system a user has authorized the digital magazine server 140 to access, another entity providing content items for presentation to the user, the content store 215 (e.g., content items included in a section of the digital magazine that the user specified), or the advertising engine 250. Additionally, content items in a candidate feed may include content items that a source 110 or the digital magazine server 140 has targeted for presentation to users having one or more characteristics of the user or may include content items that the digital magazine server 140 has identified to be recommended to the user.

In one embodiment, the recommendation engine 235 retrieves various content items from different candidate feeds and generates clusters of similar content items based on characteristics of the retrieved content items. Content items having at least a threshold likelihood of being of interest to the user are selected from each cluster and included into a consolidated feed. Based on the consolidated feed, a cover page is generated that includes content items, or information describing content items, identified by the consolidated feed. If the candidate feeds from which the consolidated feed is generated are included in a specific cluster, or in clusters with a threshold similarity to each other, the consolidated feed is used to generate a cover page describing content items in a section of a digital magazine. For example, candidate feeds for hockey, baseball, and football are aggregated into a section cover page for sports.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 10 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 140 may present identified content items based on a ranking. One or more factors associated with the content items may be used to generate the ranking. Examples of factors include: global popularity of a content item among users of the digital magazine server 140, connections between users interacting with a content item and the user providing the search query, and information from a 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device 132 of a client device 130 with modifications to content presented by a digital magazine. As an example, if the input device 132 is a touch-sensitive display, the interface generator 245 includes instructions associating different gestures with navigation through content items or presented via a digital magazine. Instructions from the interface generator 245 are communicated to a digital magazine application or other application executing on a client device 130 on which content from the digital magazine server 140 is presented. Inputs received via an input device 132 of the client device 130 are processed based on the instructions when content items are presented via the digital magazine server 140 is presented to simplify user interaction with content presented by the digital magazine server 140.

The web server 255 links the digital magazine server 140 via the network 120 to the one or more client devices 130, as well as to the one or more sources 110. The web server 255 serves web pages, as well as other content, such as JAVA®, FLASH®, XML and so forth. The web server 255 may retrieve content item from one or more sources 110. Additionally, the web server 255 communicates instructions for generating pages of content items from the layout engine 220 and instructions for processing received input from the interface generator 245 to a client device 130 for presentation to a user. The web server 255 also receives requests for content or other information from a client device 130 and communicates the request or information to components of the digital magazine server 140 to perform corresponding actions. Additionally, the web server 255 may provide application programming interface (API) functionality to send data directly to native client device operating systems, such as IOS®, ANDROID™, WEBOS® or BlackberryOS.

The advertising engine 250 receives user characteristic information and communicates with the recommendation engine 235 to select an advertisement to present to a user of the digital magazine server 140. For example, the advertising engine 250 receives information relating to advertising recommendations from the recommendation engine 235 and information from an advertiser describing advertising campaigns and policies for serving advertising to users, such as frequency caps and geotargeting. The recommendation engine 235 may query the advertising engine 250 whether to serve advertising in a given collection of content provided to the user. In response, the advertising engine 250 may provide advertising content or references to the content, either as standalone advertisements or ad groups as described in conjunction with FIGS. 4-5, which can be stored in the digital magazine server 140. The advertising engine 250 may select an advertisement to present to a user of the digital magazine based at least in part on user characteristics, such as the location of the user, the user's prior interactions with content including advertisements, or information relating to the particular collection of content the user is currently viewing, such as the publication name or topic. In some embodiments, the recommendation engine 235 receives multiple proposed advertisements from the advertising engine 250 and selects the appropriate advertisements based on its own content recommendation. The advertising engine 250 may provide information to the recommendation engine 235 as well as the search module 240 to customize content recommendations and personalize searches for users, respectively, based at least in part on advertising recommendations, campaigns, and policies.

For purposes of illustration, FIG. 2 describes various functionalities provided by the digital magazine server 140. However, in other embodiments, the above-described functionality may be provided by a digital magazine application executing on a client device 130, or may be provided by a combination of the digital magazine server 140 and a digital magazine application executing on a client device 130. For example, content items may be recommended to the user by a digital magazine application executing on the client device 130, allowing content items to be recommended to the user by the client device 130. Alternatively, information identifying content items with which a user previously interacted is communicated from a client device 130 to the digital magazine server 140, which identifies content items to recommend to the user based at least in part on the identified content items and communicates one or more of the recommended content items to the client device 130.

Page Templates

Figure 3:
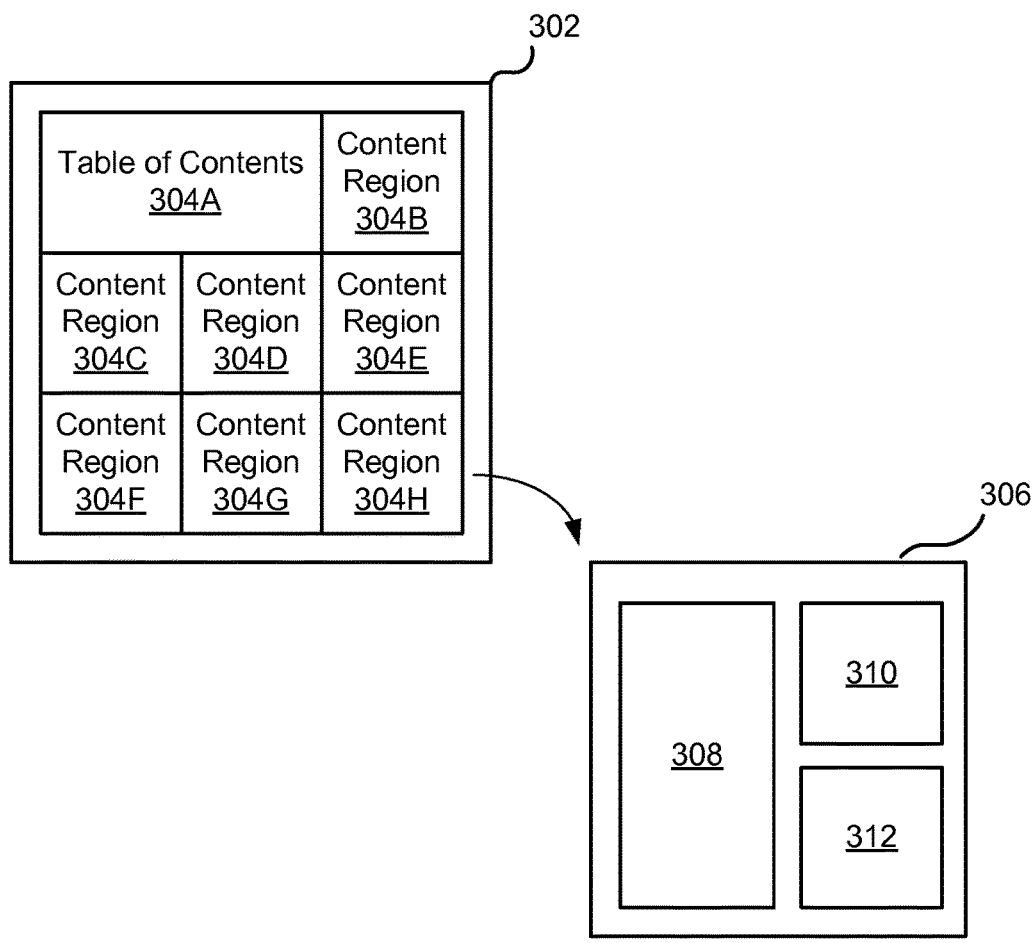
FIG. 3 is an example of presentation of content items in a digital magazine using a page template, in accordance with an embodiment.

FIG. 3 illustrates an example page template 302 having multiple rectangular slots each configured to present a content item. Other page templates with different configurations of slots may be used by the digital magazine server 140 to present one or more content items received from sources 110. As described above in conjunction with FIG. 2, in some embodiments, one or more slots in a page template are reserved for presentation of content items having specific characteristics or for presentation of a specific type of content item. In one embodiment, the size of a slot may be specified as a fixed aspect ratio or using fixed dimensions. Alternatively, the size of a slot may be flexible, where the aspect ratio or one or more dimensions of a slot is specified as a range, such as a percentage of a reference or a base dimension. Arrangement of slots within a page template may also be hierarchical. For example, a page template is organized hierarchically, where an arrangement of slots may be specified for the entire page template or for one or more portions of the page template.

In the example of FIG. 3, when a digital magazine server 140 generates a page for presentation to a user, the digital magazine server 140 populates slots in a page template 302 with content items. Information identifying the page template 302 and associations between content items and slots in the page template 302 is stored and used to generate the page. For example, to present a page to a user, the layout engine 220 identifies the page template 102 from the template store 210 and retrieves content items from one or more sources 110 or from the content store 215. The layout engine 220 generates data or instructions associating content items with slots within the page template 302. Hence, the generated page includes various "content regions" presenting one or more content items associated with a slot in a location specified by the slot.

A content region 304 may present image data, text, data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and slots in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a page presenting the content items based on the layout described by the slots of the page template. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Selecting Content Items for a Cover Page

Figure 4:
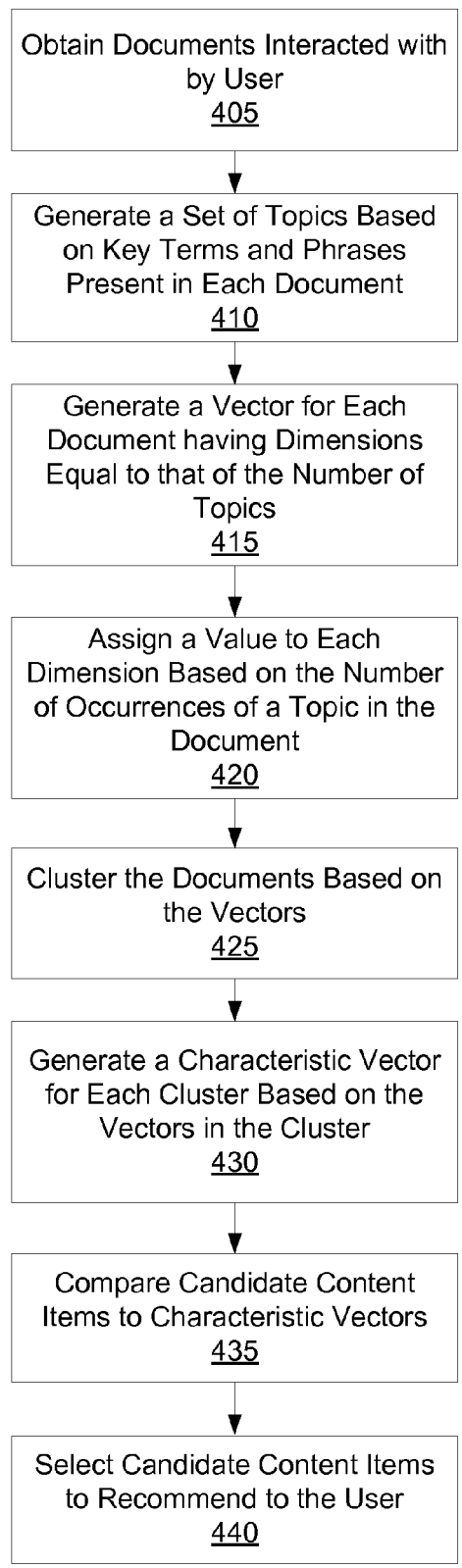
FIG. 4 shows a flowchart of one embodiment of a method for recommending content items to a digital magazine server user, in accordance with an embodiment.

FIG. 4 shows a flow chart of one embodiment of a method for recommending content items to a digital magazine server user. In one embodiment, the functionality described in conjunction with FIG. 4 is performed by the recommendation engine 235; however, in other embodiments, any suitable component or combination of components may provide the functionality described in conjunction with FIG. 4. Additionally, in some embodiments, different and/or additional steps than those identified in FIG. 4 may be performed or the steps identified in FIG. 4 may be performed in different orders.

The digital magazine server 140 obtains 405 content items previously interacted with by a user, based on information retrieved from the user profile store 205, the connection store 230 and the content store 215. In one embodiment, the recommendation engine 245 obtains 405 the content items from the content store 210. For example, the recommendation engine 235 identifies connections information between a user and various content items from the connection store 230. In one embodiment, the digital magazine server 140 determines content items to obtain 405 based at least in part on the number of connections between a user and a content item and/or the number of connections between the content item and other content items with which the user interacted. For example, content items having at least a threshold number of connections with the user are identified. In another example, content items having at least a threshold number of connections between the content item and a content item with which the user interacted within a threshold time interval from the current time are identified. Content item identifiers associated with the identified content items are retrieved from the content store 215 to obtain 405 content items with which the user interacted.

In one embodiment, the recommendation engine 235 identifies content items to obtain 405 from the content store 215 over a sliding time window determined based on one or more criteria. For example, the duration of the sliding time window is determined based at least in part on a type of content item with which the user interacted or the number of content items of a specific type present in the content store 215. Using a sliding time window allows the digital magazine server 140 to obtain 405 content items based on user interactions more relevant to a time when the content items are obtained 405. For example, the recommendation engine 235 obtains 405 news articles from the content store 210 associated with a time that is within a threshold duration of a current time (e.g., 24 hours), as a news article may be relevant to a user for a short period of time. Similarly, the recommendation engine 235 may use a time window having a relatively longer duration (e.g., two weeks) to identify content items included in a section of a digital magazine generated by the digital magazine server 140 for the user, as the relevance of a section to the user may less rapidly attenuate.

Based on key terms and/or phrases in each of the obtained content items, the digital magazine server 140 generates 410 a set of topics. For example, the recommendation engine 235 identifies specific key terms and/or phrases from each obtained content item representing topics or subjects described by various content items. Based on the key terms or phrases identified from the obtained content items, a set of one or more topics representing areas of user interest is generated 410. Hence, the digital magazine server 140 determines topics of interest to the user based on content items with which the user previously interacted.

In one embodiment, the topics generated 410 are based at least in part on a weight associated with each key term or phrase identified from a content item. The weights associated with a key term or phrase may be determined in a variety of ways. For example, weights associated with a key term or phrase are based at least in part on a content element (the title, body, caption, etc) of the content item from which the key term or phrase was identified. In one embodiment, a key term or phrase found the title of a content item receives a higher weight than a key term or phrase found in the body of a content item. In another embodiment, weights associated with a key term or phrase are based at least in part on a format with which the key term or phrase is presented to the user (e.g., in bold, a specific color, etc) to a user. For example, key phrase or term that presented in a red colored font, in a bold font, or otherwise distinguished from other text receives a higher weight than a key phrase or term presented in plain text. Alternatively, a weight associated with a key term or phrase in a content item is based at least in part on a relationship between the key term or phrase and other key terms or phrases in the content item. For example, the name of an individual in a content item related to a specific sport receives a higher weight than other key terms or phrases related to the sport included in the content item. In some embodiments, a weight associated with a key term or phrase may be based at least in part on a number of occurrences of the key term or phrase in the content item. For example, a weight associated with a phrase is proportional to a number of times the phrase appears in a content item. In another embodiment, a weight associated with a key term or phrase is based at least in part on the number or location of occurrences of the key term or phrase in a content item and across other content items. For example, a weight associated with a key term or phrase that occurs frequently in a content item and infrequently in other content items may receive a higher weight than other key terms or phrases that occur frequently in both the content item and the other content items.

Using the topics generated 410 from the obtained content items, a vector is generated 415 for one or more of the obtained content items. In one embodiment, the dimensions of the vector equal the number of generated topics. Generating a vector for an obtained content item simplifies application of one or more analytical techniques to various obtained content items based on topics included in the obtained content items.

In one embodiment, a value is assigned 420 to each dimension of a vector generated for an obtained content item based on the number of times a topic occurs in the obtained content item. Various methods may be used assign 420 a value to each dimension of an obtained content item's vector. In one embodiment, a binary value is assigned 420 to various dimensions of a vector generated for an obtained content item. For example, if a dimension corresponds to a topic included in the obtained content item or to a topic that occurs at least a threshold number of times in the obtained content item, the value assigned 420 to the dimension is one; however, if a dimension corresponds to a topic that is not included in the obtained content item or that occurs less than a threshold number of times in the obtained content item, the value assigned 420 to the dimension is zero. In the preceding example, the value of each dimension of the vector for the obtained content item indicates whether the topic associated with a dimension is included in the obtained content item. As another example, the value assigned 420 to a dimension of a vector for an obtained content item is a count of the number of occurrences of a topic corresponding to the dimension in the obtained content item. In this example, the value of a dimension of the vector represents the prevalence of a topic corresponding to the dimension in the obtained content item. In an additional example, the value assigned 420 to a dimension of a vector for an obtained content item increases at a rate that decreases as the number of occurrences of the topic in the obtained content item increases, so the value of a dimension is weighted by the prevalence of a topic associated with the dimension in the content item for which the vector was generated 415.

Based at least in part on the vectors representing various obtained content items, the obtained content items are clustered 425, which allows different clusters of content items to represent different combinations of user interests. In one embodiment, K-means clustering is used to cluster 425 the obtained content items based on the vectors representing the various obtained content items. Using K-means clustering causes an obtained content item to be clustered based on the distance of each dimension of a vector representing the obtained content item to a mean value associated with a dimension across all vectors representing obtained content items. For example, obtained content items with a vector having a value associated with a dimension that is within a specified distance to a mean value associated with the dimension are included in a cluster. Using the vectors for various obtained content items in a cluster, the recommendation engine 235 generates 430 a characteristic vector for one or more of the clusters. For example, a characteristic vector is generated 430 for each cluster based on the vectors corresponding to each obtained content item in a cluster. A characteristic vector represents a combination of interests to the user included in a cluster. In one embodiment, various characteristic vectors are stored and associated with a user profile, allowing the digital magazine server 140 to more efficiently retrieve information describing a user's interests.

In one embodiment, weights are associated with dimensions of each vector for an obtained content item, and these weights are used when generating 430 a characteristic vector for a cluster including the vector. For example, a weight associated with a vector's dimension is based on a type of the obtained content item from which the vector was generated 415. For example, a topic represented by a dimension is given a relatively higher weight if the content item is an image than if the content item is a blog entry. In this example, associating a higher weight to a dimension if a content item is an image increases the contribution of a topic associated with the dimension of the content item to a cluster relative to the contribution of the topic associated with the dimension of a content item that is a blog entry. Hence, the characteristic vector of the clusters in this example would represent a combination of user interests biased towards one or more topics associated with images rather than topics associated with blog entries. In another example, a weight associated with a vector's dimension is based on a relationship between the value of the dimension and a threshold value based on a type of obtained content item for which the vector was generated 415 or based on the content of the content item for which the vector was generated 415. As a specific example, a news article on football includes a player's name and multiple mentions of the word "football," and the value assigned 420 to each dimension of a vector for the news article is a count of the number of times a topic occurs in the news article. By differently weighting the topics of "football" and the player's name based on whether the value of each dimension is above or below a threshold value, two characteristic vectors for different clusters of content items, one representing a cluster of content items related to football and the football player and the other representing a cluster of content items related to football but not the football player may be generated 430.

One or more candidate content items for presentation to the user are identified from the content store 215 or are received from a source 110. As described above, a vector is generated for a candidate content item by identifying topics based on key phrases or terms in the candidate content item and generating the vector based on the topics; various dimensions of the vector may represent one or more topics present in the candidate content item. The vectors representing the candidate content items are compared 435 to one or more characteristic vectors. For example, a vector is generated for a candidate content item, and the candidate content item's vector is compared to each characteristic vector associated with the user. In one embodiment, scores representing a similarity between vectors generated for candidate content items and one or more of the characteristic vectors associated with the user are generated and used to rank the candidate content items. In one embodiment, the candidate content item is obtained from a list of candidate content items in the content store 215 for recommendation to various digital magazine server users. In other embodiments, the candidate content item may be obtained from an identified source 110 (e.g., a social networking system identified by the user that interacted with the obtained content items) or based on connections between various content items and content items with which the user previously interacted.

Various methods may be used to compare 435 a candidate content item with characteristic vectors. For example, cosine similarities between the vector generated from the candidate content item and various characteristic vectors are determined or cosine similarities between the vector generated from the candidate content item and the centroids of various clusters are determined. However, any suitable technique may be used to compare 435 candidate content items with characteristic vectors by determining a measure of similarity between the candidate content item and the characteristics vectors of various clusters.

Based on the comparison between one or more candidate content items and one or more characteristic vectors, one or more candidate content items for recommendation to the user are selected 440. Various methods may be used to select 440 a candidate content item for recommendation to the user. In one embodiment, a candidate content item is initially scored based on at least in part a relationship between the topics in the vector for the candidate content item and the characteristic vector of each cluster. Hence, candidate content items having vectors identifying topics matching or similar to topics in a characteristic vector have a higher score than candidate content items having vectors that do not identify topics matching or similar to topics identified by a characteristic vector. In another example, the score associated with each content item is based at least in part on the content type of the candidate content item and the characteristic vector of each cluster. For example, the content type of the candidate content item is compared to the content type of obtained content items in a cluster, and the score of the candidate content item is increased if its content type matches a content type of at least a threshold number of obtained content items in a cluster. In one embodiment, the recommendation engine 235 ranks the candidate content items based on their associated scores and selects candidate content items having at least a threshold position in the ranking. Information describing or otherwise identifying the selected candidate content items may be identified to the user or one or more of the selected content items are presented to the user. Alternatively, the recommendation engine 235 selects one or more candidate content items for presentation to the user that have at least a threshold similarity to a characteristic vector associated with a user.

While FIG. 4 describes generation of vectors for content items and characteristic vectors describing clusters of content items, in other embodiments, any suitable representation of obtained content items and/or characteristic representations for clusters of obtained content items may be generated. A representation of a content item includes various dimensions based on topics identified from the content item. As described above, a value of a dimension may be based on a number of times a topic associated with the dimension occurs in the content item. Hence, in various embodiments, different representations of a content item based on topics included in the content item may be used to perform the functionality described above in conjunction with FIG. 4.

Selecting Content Items for a Cover Page

Figure 5:
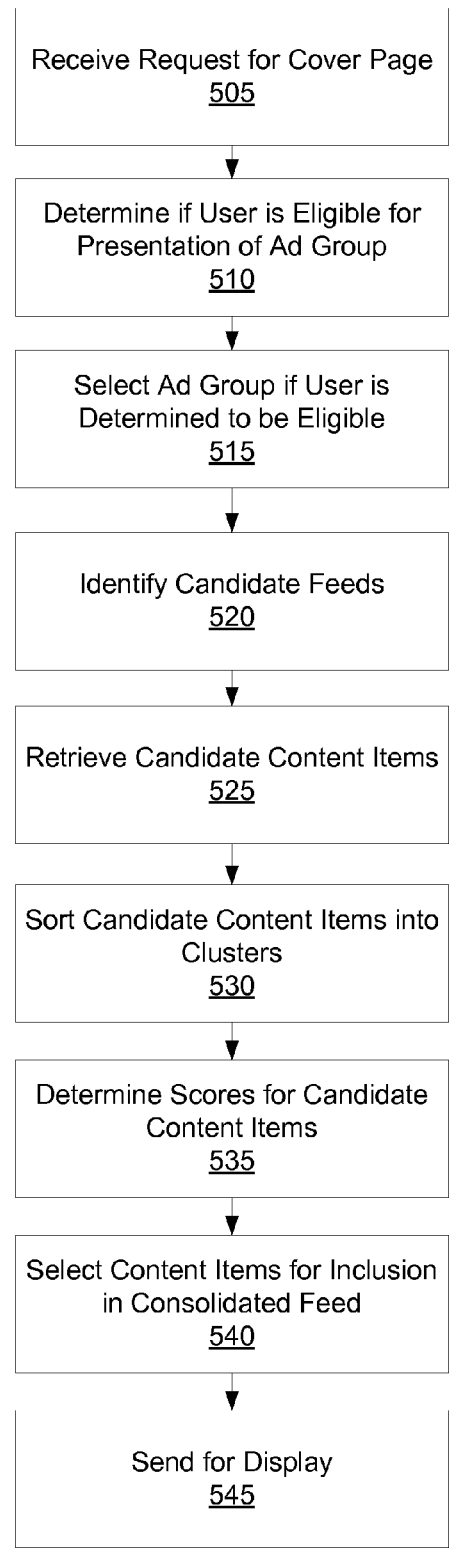
FIG. 5 shows a flowchart of a method for presenting a cover page identifying content items included in various feeds of content, in accordance with an embodiment.

FIG. 5 shows a flowchart of one embodiment of a method for presenting a cover page identifying content items included in various feeds of content to a digital magazine server user. In one embodiment, the functionality described in conjunction with FIG. 5 is provided by the digital magazine server 140; however, in other embodiments, any suitable component or combination of components may provide the functionality described in conjunction with FIG. 5. Additionally, in some embodiments, different and/or additional steps than those identified in FIG. 5 may be performed or the steps identified in FIG. 5 may be performed in different orders.

The digital magazine server 140 receives 505 a request for a cover page from a user of the digital magazine server 140. The request includes information about a user of the digital magazine server 140, such as information identifying the user, identifying a geographic location associated with the user (e.g., a location associated with a client device 130 associated with the user), identifying interactions with one or more content items provided by the digital magazine server 140 to the user, and identifying preference of the user for a content item or type of content items.

Based on the received request, the digital magazine server 140 determines 510 if the user is eligible to be presented with an ad group. In some embodiments, the digital magazine server 140 retrieves a frequency cap associated with the ad group when determining 510 if the user is eligible to be presented with an ad group. The frequency cap specifies a maximum number of times an ad group may be presented to the user within a time interval. For example, a frequency cap indicates that an ad group is presented to a user a maximum of one time per day. The digital magazine server 140 may determine the frequency cap based at least in part on historical information describing user interaction with the digital magazine server 140 (e.g., a frequency with which the user interacts with the digital magazine server, interactions between the user and the digital magazine server within a threshold time interval, etc.), a setting received from a source 110 associated with an ad group, characteristics of a client device 130 associated with the user. Example characteristics of the client device 130 include physical dimensions of a display device 132 of the client device 130, a resolution of the display device 132 of the client device 130, information describing a connection between the client device 130 and a network 120, or other suitable information. In some embodiments, the digital magazine server 140 determines 510 if a user is eligible to be presented with an ad group by retrieving a user profile associated with the user or other information associated with the user and identifying a number of times the user has been presented with an ad group within the time interval. If the retrieved information associated with the user indicates the user has been presented with an ad group less than a number of times within the time interval specified by the frequency cap, the digital magazine server 140 determines 510 the user is eligible to be presented with an ad group. In other embodiments, the digital magazine server 140 determines 510 if the user is eligible to be presented with an ad group based at least in part on one or more privacy settings selected by the user or selected by the digital magazine server 140. For example, if the user is associated with a privacy setting preventing presentation of an ad group to the user, the user is determined 505 to not be eligible to be presented with an ad group.

If the digital magazine server 140 determines 510 the user is eligible to be presented with an ad group, the digital magazine server 140 selects 515 an ad group for presentation to the user. In one embodiment, an ad group is associated with a topic and includes different content items associated with the topic that are determined based on characteristics of the user. Example characteristics of a user include biographic information about the user, additional users connected to the user, and interactions between the user and content items.

In some embodiments, characteristics associated with the user are used to select 515 an ad group. For example, an ad group associated with a location within a threshold distance of a location specified by the request is selected 515, allowing selection of the ad group to account for the location received from the user's client device 130. As another example, one or more interests or topics associated with the user are used to select 515 the ad group, so the selected ad group includes content items associated with a topic or interest matching or similar to an interest associated with the user. In another example, an ad group associated with a topic matching or similar to a topic associated with at least one section of a digital magazine defined by the user is selected 515. In a further example, an ad group associated with at least a threshold number of topics matching or similar to topics associated with sections of the digital magazine defined by the user or associated with the user is selected 515.

In some embodiments, an ad group is selected 515 based at least in part on a bid amount associated with the ad group by an advertiser. A bid amount associated with an ad group specifies an amount of compensation the advertiser provides the digital magazine server 140 for presenting the editorial section in a cover page presented to a user. When selecting 515 an ad group, the digital magazine server 140 may rank various ad groups based on their associated bid amounts. For example, the digital magazine server 140 determines an expected value associated with various ad groups based on a bid amount associated with each ad group and a likelihood of the user interacting with each ad group. The ad groups are ranked based at least in part on their associated expected values, and an ad group having a maximum position in the ranking or having at least a threshold position in the ranking is selected 515. In some embodiments, an advertiser associates targeting criteria, as well as a bid amount, with an ad group, so the advertiser compensates the digital magazine server 140 if the ad group is presented to users satisfying the targeting criteria but does not compensate the digital magazine server 140 if the ad group is presented to users that do not satisfy the targeting criteria.

In one embodiment, the digital magazine server 140 identifies 520 candidate feeds of content items. A candidate feed, such as an ad group, includes one or more content items. One or more candidate feeds may include content items specific for presentation to a user. Additionally, a candidate feed may include content items selected for presentation to users satisfying one or more criteria or may include content items for presentation to any user of the digital magazine server 140. Examples of candidate feeds including content items specific for a user include a section of a digital magazine that a user defined, content items from a social networking system account associated with a user, or content items recommended by the digital magazine server 140 for a user.

In one embodiment, a user-defined section of a digital magazine is stored in the content store 215 and may identify sources of content items from which content items in the user-defined section are retrieved. Examples of sources of content items include an identification of a digital magazine, an identification of a news source, an identification of an external content provider (e.g., a website or other content provider), an identifier of content aggregator, or an identifier of a rich site summary (RSS) feed. Content items may be obtained from sources of content items based on a user's subscription to a source of content items, where the user compensates the source of the content item for access to the content items, or the sources of content items may include publicly accessible content items. One example user-defined section is a digital magazine called "The Continuing Failures of Timmy Tebow," so content items are retrieved from the digital magazine. An alternative user-defined section retrieves content items from a blog showcasing Tim Tebow interceptions. User-defined sections may be populated with content items retrieved by the search module 240 according to one or more search terms. For example, a user enters the search terms "Tim Tebow" and "poor judgment," and the search module 240 returns content items satisfying one or more of the search terms.

The digital magazine server 140 identifies 520 candidate feeds from social media feeds, which include content items from one or more social networking systems associated with a user profile of a digital magazine server user. The user may provide the digital magazine server 140 with authorization to access one or more of the social networking systems. For example, the user provides the digital magazine server 140 with access credentials such as a username and password. Alternately or additionally, the user may authorize the digital magazine server 140 access to the social networking system by identifying to the social networking system that the digital magazine server 140 is authorized to access information associated with the user; the social networking system 140 may then communicate the digital magazine server 140 an access key or code. The digital magazine server 140 retrieves user-generated content items from the social networking system and incorporates the received one or more content items for presentation to the user by the social networking system into a social media feed.

The digital magazine server 235 also identifies 520 candidate feeds based on recommended content items. In one embodiment, the digital magazine server 140 recommends content items as described above in conjunction with FIG. 4. Alternately or additionally, the digital magazine server 140 uses connections between a user and content items to identify content items for recommendation to the user. In one embodiment, the digital magazine server 140 records users' interactions with content items in the user profile store 205. The connection generator 225 generates weighted connections between various users and content items based on these interactions, which are stored in the connection store 230. Some connections may be associated with inferred weights that may be used to infer a user's interests from the connections, allowing the digital magazine server 140 to recommend content items to a user based on the inferred user interests. When a connection between a user and a content item with which the user has not previously interacted has a weight equaling or exceeding a threshold value, the content item is recommended to the user. For example, a user views numerous content items showing Tim Tebow interceptions while he plays professional football. Based on interactions from other users, the connection generator 225 infers connections between content items showing Tim Tebow interceptions while he plays professional football and content items showing Tim Tebow interceptions while he plays college football. Hence, the connection generator 225 infers a connection between the user and the Tim Tebow college interception content items. The Tim Tebow college interception content items having a connection with at least a threshold weight are included in a candidate content feed for the user by the digital magazine server 140.

Additionally, the digital magazine server 140 identifies 520 candidate feeds including content items for presentation to multiple digital magazine server users. For example, a candidate feed includes content items for presentation to digital magazine server having one or more characteristics. In one embodiment, the digital magazine server 140 infers that users having a particular set of characteristics are interested in one or more content items, so these content items are incorporated into a candidate feed for presentation to users having at least a threshold number of characteristics in the set. Alternately or additionally, content items are manually selected for incorporation into a candidate feed for presentation to users having one or more characteristics. An example targeted candidate feed includes content items showing Tim Tebow fumbling a football that is identified for presentation towards male digital magazine server users between the ages of twenty and sixty who live outside of Florida.

The digital magazine server 140 also identifies 520 candidate feeds applicable to a broad range of users. In one embodiment, a set of candidate feeds are defined that each include content items associated with particular categories (e.g., local news, national news, world news, sports, entertainment). For example, a candidate feed includes featured stories chosen by an editor of the digital magazine server 140 or by an external entity for presentation to various digital magazine server users.

Based on the identified candidate feeds, the digital magazine server 140 retrieves 525 candidate content items. In one embodiment, the retrieved content items are stored in the content store 215. The retrieved content items are evaluated for inclusion in a cover page describing content items in a digital magazine or in a section of a digital magazine. In an alternate embodiment, content items are retrieved from one or more sources 110. In one embodiment, the digital magazine server 140 applies filters to the retrieved content items to limit content items evaluated for inclusion on the cover page. For example, content items may be filtered from consideration for inclusion in a cover page based on obscenity or age relevance. For example, content items relating to Bill Belichick's views on morality are filtered to be excluded from presentation on cover pages presented to users less than eighteen years old.

The retrieved candidate content items are sorted 530 into one or more clusters based at least in part on the content elements of the candidate content items. Some of the techniques described above in conjunction with FIG. 4 may be used to sort 530 candidate content items into clusters. Generally, sorting 530 content items into clusters produces various clusters that include content items associated with a common topic or associated with similar topics. In one embodiment, topics are associated with a candidate content item based on the content elements of the content item. Topics may be identified based the frequency with which terms or phrases appear in content elements or based on the presentation of various words or phrases relative to other words or phrases, as described above in conjunction with FIG. 4. In various embodiments, words may be grouped into phrases for identifying topics based on an external reference or based on repeated proximity in a candidate content item or in various candidate content items. For example, a content item about Tim Tebow may correspond to the topics "Tim Tebow," "interception," and "running back." Topics may be determined based on video captions, categories, titles, or photo titles and captions. A vector describing a candidate content item is generated from the topics identified from the candidate content item. The vector has at least as many dimensions as the number of associated topics, and the weight of each dimension may be based in part on the number of times a topic occurs in the candidate content item. Generation of a vector from a content item is further described above in conjunction with FIG. 4.

Alternately or additionally, vectors are generated based on the content elements in a content item without generating topics. For example, a vector is generated having dimensions corresponding to words in the content item, where common words such as articles, conjunctions, and prepositions are omitted. The weighting of each dimension in the vector may be based on the number of occurrences in a content item or across content items, location of a word in a candidate content item (e.g., headline, sub-headline, body text, category), or emphasis on the word (e.g., underlining, bolding, italicizing, linking to an external page, different coloration from other text) in a candidate content item. Other content elements of candidate content items may be used to generate a vector describing a candidate content item. For example, two content items having a similar image have a similar weight in the dimension of their respective vectors corresponding to that image. As another example, clips are identified in videos and associated with a dimension of the vector. Two content items having the same video clip may have differing weights in a vector dimension corresponding to the video clip based on the duration of the video clip presented by each of the content items.

The vectors representing the candidate content items are sorted 530 into clusters using one or more standard clustering algorithms (e.g., K-means, expectation-maximization, density-based). Hence, content items relating to similar topics are likely grouped into a common cluster. For example, if a candidate feed includes content items about football, football stories about Peyton Manning, Bill Belichick, and stories about the man formerly known as Chad Ochocinco, these candidate content items would be sorted 530 into separate clusters for each identified person.

Scores for the candidate content items are determined 535 based on the user. Content items may be scored based on a weight associated with a connection between the user and the content item from the connection store 230. In one embodiment, content items are scored by determining a characteristic vector for a cluster including candidate content items. The characteristic vector is based at least in part on vectors describing one or more candidate content items in the cluster. For example, the characteristic vector for a cluster may be determined from the mean of the vectors in the cluster. The score of a candidate content item may be determined 535 based on a measure of similarity between the vector corresponding to the candidate content items and a characteristic vector of the cluster including the candidate content item. Example measures of similarity include cosine similarity or the generalized Euclidean distance between a vector and the characteristic vector. Alternately or additionally, a score is determined 535 by comparing the vector representing a candidate content item to a characteristic vector based on previous interactions of the user with content items as described above. In one embodiment, a composite score is calculated from a combination of a score based on connection weights, a score based on similarity to other candidate content items in a cluster, and a score based on similarity to a characteristic vector representing previous user interactions with content items.

Based on the determined scores, at least one content item from each of the one or more clusters is selected 540 for inclusion into a consolidated feed. In one embodiment, the candidate content items in a cluster are ranked based on the determined scores, and at least one content item having a threshold position in the ranking is selected 540. Alternately or additionally, the candidate content items in a cluster having at least a threshold score are selected 540 for inclusion into the consolidated feed. For example, out of a cluster of Tim Tebow content items, content items include a story about Tim Tebow playing tight end and a story about Tim Tebow being cut from professional football have greater than the threshold score, so they are selected 540 for inclusion in the consolidated feed. Hence, the consolidated feed includes stories suitable for identification via a cover story.

In one embodiment, the stories of the consolidated feed are again sorted 530 into clusters and scored 535, and a subset of stories from the consolidated feed is selected 540 for inclusion into a further consolidated feed. This consolidation may continue until one or more conditions are satisfied. For example, conditions may be based on the scores, relevance to the user, diversity, and/or the number of selected content items. A condition may specify that a threshold number of content items from different candidate feeds are present or that content items from at least a threshold number of candidate feeds are present. For example, conditions may specify that three content items from social media feeds are present in the consolidated feed along with three content items recommended for a user and six stories from one or more sources 110.

In one embodiment, there are a plurality of consolidated feeds, with content items selected 540 for inclusion into a particular consolidated feed based on a measure of similarity between a content item and other content items in the particular consolidated feed. Hence, these particular consolidated feeds allow content items to be further consolidated. These particular consolidated feeds may represent cover pages for various sections of a digital magazine associated with different topics or subjects. For example, candidate feeds for a user variously include content items associated with hockey, baseball, Germany, Ghana, and Portugal. Content items from the hockey and baseball candidate feeds are selected for inclusion into a further consolidated feed including content items relating to sports, and content items from the candidate feeds about Germany, Ghana, and Portugal are selected for inclusion into a further consolidated feed about world news. The further consolidated feeds may undergo additional combination to form consolidated feeds describing overall content of a digital magazine.

Hence, the consolidated feeds may be hierarchically organized to describe varying numbers of content items for different sections of a digital magazine. This hierarchical organization may include any number of levels of consolidated feeds representing cover pages of sections or subsections within a digital magazine. In one embodiment, the digital magazine server 140 uses heuristics to determine which consolidated feeds are further combined. These heuristics may seek to replicate a desired tone of the cover page. Heuristics may ensure diversity by combining consolidated feeds including content items having similar topics or subjects to increase diversity of the resulting cover page. Heuristics may also be based on relevance to user. For example, consolidated feeds including content items with less than a threshold likelihood of relevance to the user are combined or are discarded from consideration. Other heuristics may enforce quotas for certain types of content (e.g., a minimum number of news stories, sports stories, featured stories, or social media content items).

The consolidated feed (or any further consolidated feeds) is sent 545 to a client device 130 associated with the user for display (e.g., on the display device 132). The content items in the consolidated feed may be presented as a cover page, a table of contents, a section cover page, or a sub-section cover page. In one embodiment, the content items in the consolidated feed are evaluated for a measure of similarity. Content items with at least a threshold measure of similarity are arranged so that similar content items are displayed in proximity to each other. In one embodiment, the layout engine 220 selects a layout template from the template store 210 based on device characteristics of the client device 130 or display device 132. The layout engine 210 arranges the content items in the consolidated feed based at least in part on characteristics of the user, known content preferences, similarity between content items, and a promotional consideration. If the user was determined 515 to be eligible to be presented with an ad group, a location associated with the ad group selected for presentation to the user is a factor when arranging content items in the consolidated feed. A specific location is associated with the ad group, so a content item from the selected ad group is presented in the same location within consolidated feeds presented to different users of the digital magazine server 140. This allows the digital magazine server 140 to maintain a specific location within the consolidated feed for presenting advertisement content to the user and to other users. For example, if the consolidated feed is presented as a cover page, a location within the cover page relative to locations in the cover page in which content items from various consolidated feeds are presented. Presentation of the ad group is further described below in conjunction with FIGS. 6A and 6B. The displayed cover page may show previews of content items arranged in the page template. These previews may include a headline, title, summary, image, animation, or any other content element from the corresponding content item. Depending on user preferences and the available layouts for a client device 130, cover pages may be presented to the user as multiple content items, or previews thereof, on a single page or as single content items, or previews thereof, in a serial order (e.g., for smaller devices or if the user elects to view one content item at a time).

Figure 6A:
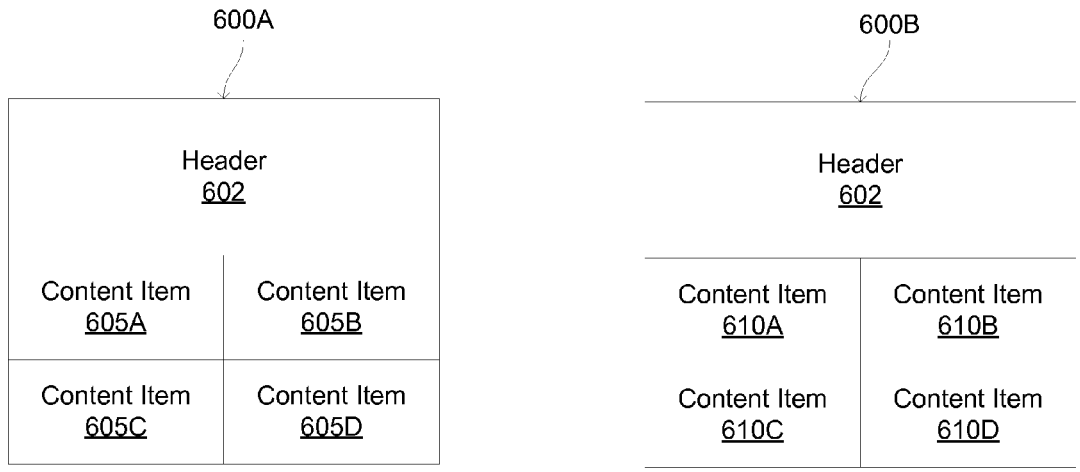
FIGS. 6A and 6B are example user interfaces illustrating inclusion of an ad group in cover pages presented to users of a digital magazine server, in accordance with an embodiment.

FIG. 6A is an example user interface illustrating cover pages presented to two different users of a digital magazine server. A cover page includes information describing one or more content items included in various sections of the digital magazine, as previously described in conjunction with FIG. 2. In the example of FIG. 6A, the cover page 600A is presented to a user of the digital magazine server 140, and the cover page 600B is presented to an additional user of the digital magazine server 140. The cover page 600A includes content items 605A-D for presentation on a display device 132 of a client device 130 associated with a user of the digital magazine server 140. Similarly, the cover page 600B includes content items 610A-D for presentation on a display device 132 of a client device 130 associated with the additional user of the digital magazine server 140. Each content item 605 is positioned in a specific location relative to the other content items 605 included in the cover page 600A, while each content item 610 is positioned in a specific location relative to the other content items 610 included in the cover page 600B, providing a consistent user interface appearance the user and for the additional user. Content items 605A-D are selected from various consolidated feeds associated with the user, while content items 610A-D are selected from various consolidated feeds associated with the additional user. Selection of content items 605A-D and content items 610A-D is further described above in conjunction with FIG. 5. For example, the content item 605A may be a content item selected from a consolidated feed associated with technology, while content items 605B, 605C, and 605D may be content items selected from candidate feed associated with golf, cooking, and cycling, respectively. To personalize interaction of users with the digital magazine server 140, content items included in a cover page are selected based on characteristics of the user viewing the cover page, as described in conjunction with FIG. 5. Accordingly, one or more of the content items 605A-D included in the cover page 600A presented to the user is likely to differ from one or more of the content items 610A-D included in the cover page 600B presented to the additional user. For example, content items 605A-D are associated with different topics than content items 610A-D.

The user may select a content item 605 presented by the cover page 600A to be presented with one or more content items from the consolidated feed associated with the selected content item 605. When a content item 605 is selected, the cover page 600A is replaced with content from the consolidated feed associated with the selected content item 605. A user may navigate through one or more additional content items in the consolidated feed associated with the selected content item 605 to discover further content items related to a topic, interest, or source 610 associated with the consolidated feed.

Figure 6B:
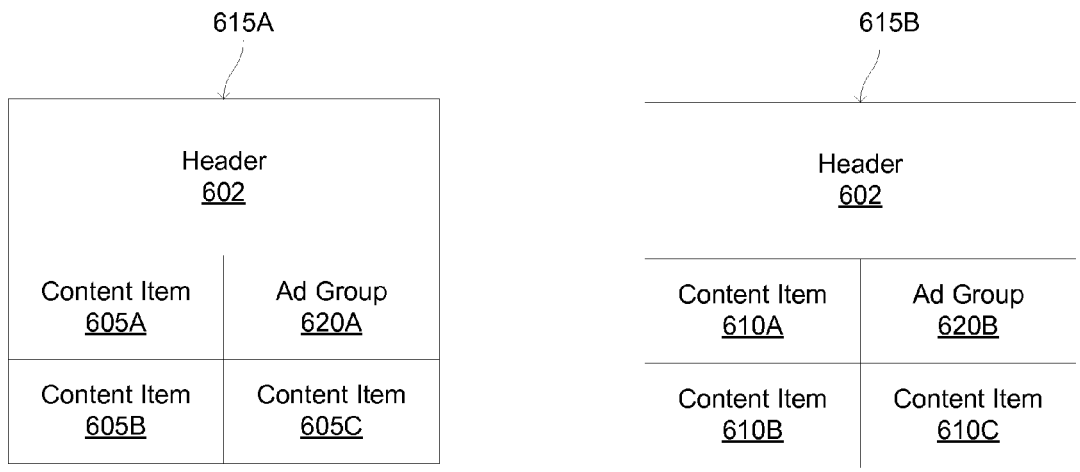

FIG. 6B is an example user interface illustrating inclusion of an ad group in cover pages presented to two different users of a digital magazine server 140, where each users has been determined to be eligible to be presented with an ad group. In the example of FIG. 6B, the cover page 615A is presented to the user described above in conjunction with FIG. 6A, and the cover page 615B is presented with the additional user described above in conjunction with FIG. 6B. When generating the cover page 615A, the digital magazine server 140 selects an ad group 620 including content in which advertisements or content associated with a specific topic are presented. The ad group 620 is included in a common location within cover pages 615A, 615B, generated for presentation to multiple users of the digital magazine server. For example, as shown in FIG. 6B, the cover page 615A includes content items 605A, 605B, 605C, and ad group 620A for presentation on a display device 132 of a client device 130 associated with a user of the digital magazine server 140. Similarly, the cover page 615B includes content items 610A, 610B, 610C, and an ad group 620B for presentation on a display device 132 of a client device 130 associated with the additional user of the digital magazine server 140. Ad group 620A and ad group 620B may be associated with different topics or with different locations based on characteristics of the user and the additional user, respectively.

As shown in FIG. 6B, an ad group 620 is presented in the same location of a cover page relative to other content items in the cover page for each user eligible to be presented with an ad group 620. Hence, an ad group 620 appears in the same location relative to other content items presented by cover pages presented to various users, while other content items presented by the cover pages are shifted, so that even though different content items are shown to each user, the location of the ad group 620 relative to other content items in the cover page is the same for each user. For example, the ad group 620A appears in the upper right region of the cover page 615A when displayed to the user and the ad group 620B also appears in the upper right region of the cover page 615B to the additional user. Comparing the cover page 615A to 600A, which are presented to the user, the position of the content item 605B has shifted from the upper right region of the cover page 600A shown in FIG. 6A to the lower left region of the cover page 615A shown in FIG. 6B, while the position of the content item 605A remains the same in both cover pages 600A and 615A.

When a user selects an ad group 620, content from a feed associated with the ad group 620 is presented to the user via the display device 132 of the user's client device 132. The feed associated with the ad group 620 includes an advertisement and one or more content items, with one or more content items indicated to be presented n prior to the advertisement. This allows an advertiser to provide context associated with an advertisement included in the geed associated with the ad group to increase likelihood of a user interacting with the advertisement. In one example, if the ad group 620 is selected, a content item included in the ad group is initially presented to the user, and when the user requests an additional content item from the feed associated with the ad group, the advertisement is presented. Alternatively, if the ad group 620 is sponsored by an advertiser, a content item from the ad group 620 provided by the advertiser is presented as the advertisement, and may appear as the content item associated with the ad group 620 in a cover page along with an indication that the content item is sponsored. This allows an advertiser to present a content item in a cover page presented to a user to increase the likelihood of the user viewing or interacting with the content item.

In the examples of FIGS. 6A and 6B, the cover pages 600, 615 each include a header 602. The header 602 includes text data, image data, video data, or other data. For example, the header 602 includes content from a content item presented in the cover page 600, 615, such as a content item the digital magazine server 140 determines to be most relevant to a user viewing the cover page 600, 615.

SUMMARY

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the specified purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

What is claimed is:

1. A method comprising:
    receiving a request for a cover page of a digital magazine from a digital magazine server user, the cover page including information identifying a plurality of groups of content items;
    determining the digital magazine server user is eligible to receive a specified group of content items based at least in part on historical information describing the user's interactions with the digital magazine server during a specified threshold time interval;
    selecting the specified group of content items in response to the determining;
    identifying a plurality of candidate feeds of content items to include in the specified group of content items, the plurality of candidate feeds including the specified group;
    retrieving a plurality of candidate content items from the plurality of candidate feeds;
    sorting the retrieved candidate content items into a plurality of clusters based at least in part on a common topic associated with elements of the retrieved content items;
    for each content item in a cluster, scoring the sorted content item based on a measure of similarity between the content item and other content items in the cluster;
    ranking scored content items in each cluster based on the scoring;
    selecting at least one scored content item from each of the plurality of clusters having threshold position in the ranking;
    including the at least one scored content item selected from each of the plurality of clusters in the specified group of content items; and
    generating the cover page including the specified group of content items and information describing additional content items for display to the digital magazine server user, the specified group of content items included in a specific location within the cover page relative to the additional content items included in the cover page, the specific location within the cover page determined by the digital magazine server based on prior interactions by digital magazine server users with content included in various locations within previously presented cover pages.

2. The method of claim 1, wherein determining if the digital magazine server user is eligible to receive a specified group of content items further comprises:
    retrieving a frequency threshold associated with the specified group of content items;
    determining whether a number of times that the specified group of content items has been presented to the user exceeds the frequency threshold; and
    determining that the user is eligible to receive the group of content items when the number of times that group of content items has been presented to the user is less than the frequency threshold.

3. The method of claim 1, wherein the specified group of content items is associated with a topic and includes different content items associated with the topic.

4. The method of claim 3, wherein the topic is determined based on one or more characteristics of the digital magazine server user.

5. The method of claim 4, wherein one or more characteristics of the digital magazine server user includes a location within a threshold distance of a location specified by the request.

6. The method of claim 1, wherein the plurality of candidate feeds include a feed of content items from one or more social networking systems associated with the user's profile on the digital magazine server.

7. The method of claim 1, wherein the plurality of candidate feeds include a feed of content items from a section of the digital magazine defined by the digital magazine server user.

8. The method of claim 1, wherein scoring the sorted content item further comprises scoring the content item based on a weight associated with a connection between the digital magazine server user and the content item.

9. The method of claim 1, further comprising:
including selected content items from one or more clusters in a consolidated feed of content items;
including the specified group of content items in a specified position in the consolidated feed; and
presenting the consolidated feed in a location within the cover page relative to locations in the cover page in which content items from additional consolidated feeds are presented.

10. The method of claim 1, further comprising:
including selected content items from one or more clusters in a consolidated feed of content items;
including the specified group of content items in a specified position in the consolidated feed; and
generating for display to a plurality of digital magazine server users, a plurality of cover pages, each of the plurality of cover pages including the consolidated feed in the same location within cover page relative to locations in the cover page in which content items from additional consolidated feeds are presented.

11. A non-transitory computer readable medium comprising instructions that when executed by a processor cause the processor to:
receive a request for a cover page of a digital magazine from a digital magazine server user, the cover page including information identifying a plurality of groups of content items;
determine the digital magazine server user is eligible to receive a specified group of content items based at least in part on historical information describing the user's interactions with the digital magazine server during a specified threshold time interval;
selecting the specified group of content items in response to the determination;
identify a plurality of candidate feeds of content items to include in the specified group of content items, the plurality of candidate feeds including the specified group;
retrieve a plurality of candidate content items from the plurality of candidate feeds;
sort the retrieved candidate content items into a plurality of clusters based at least in part on a common topic associated with elements of the retrieved content items;
for each content item in a cluster, scoring the sorted content item based on a measure of similarity between the content item and other content items in the cluster;
rank scored content items in each cluster based on the scoring;
select at least one scored content item from each of the plurality of clusters having a threshold position in the ranking;
include the at least one scored content item selected from each of the plurality of clusters in the specified group of content items; and
generate the cover page including the specified group of content items and information describing additional content items for display to the digital magazine server user, the specified group of content items included in a specific location within the cover page relative to the additional content items included in the cover page, the specific location within the cover page determined by the digital magazine server based on prior interactions by digital magazine server users with content included in various locations within previously presented cover pages.

12. The non-transitory computer readable medium of claim 11, wherein instructions that cause the processor to determine if the digital magazine server user is eligible to receive a specified group of content items further cause the processor to:
retrieve a frequency threshold associated with the specified group of content items;
determine whether a number of times that the specified group of content items has been presented to the user exceeds the frequency threshold; and
determine that the user is eligible to receive the group of content items when the number of times that group of content items has been presented to the user is less than the frequency threshold.

13. The non-transitory computer readable medium of claim 11, wherein in the specified group of content items is associated with a topic and includes different content items associated with the topic.

14. The non-transitory computer readable medium of claim 13, wherein the topic is determined based on one or more characteristics of the digital magazine server user.

15. The non-transitory computer readable medium of claim 14, wherein one or more characteristics of the digital magazine server user includes a location within a threshold distance of a location specified by the request.

16. The non-transitory computer readable medium of claim 11, wherein the plurality of candidate feeds include a feed of content items from one or more social networking systems associated with the user's profile on the digital magazine server.

17. The non-transitory computer readable medium of claim 11, wherein the plurality of candidate feeds include a feed of content items from a section of the digital magazine defined by the digital magazine server user.

18. The non-transitory computer readable medium of claim 11, wherein instructions that cause the processor to score the sorted content item further comprise instructions that cause the processor to score the sorted content item based on a weight associated with a connection between the digital magazine server user and the content item.

19. The non-transitory computer readable medium of claim 11, further comprising instructions that cause the processor to:
include selected content items from one or more clusters in a consolidated feed of content items;
include the specified group of content items in a specified position in the consolidated feed; and
present the consolidated feed in a location within the cover page relative to locations in the cover page in which content items from additional consolidated feeds are presented.

20. The non-transitory computer readable medium of claim 11, further comprising instructions that cause the processor to:
include selected content items from one or more clusters in a consolidated feed of content items;
include the specified group of content items in a specified position in the consolidated feed; and
generate for display to a plurality of digital magazine server users, a plurality of cover pages, each of the plurality of cover pages including the consolidated feed in the same location within cover page relative to locations in the cover page in which content items from additional consolidated feeds are presented.

* * * * *

UNITED STATES PATENT AND TRADEMARK OFFICE
CERTIFICATE OF CORRECTION

PATENT NO. : 9,965,774 B2
APPLICATION NO. : 14/738236
DATED : May 8, 2018
INVENTOR(S) : David Huynh et al.

Page 1 of 1

It is certified that error appears in the above-identified patent and that said Letters Patent is hereby corrected as shown below:

In the Claims

In Column no: 29, Line(s) no: 40-41, Claim 11, "interval; selecting the" to read as --interval; select the--

In Column no: 29, Line(s) no: 52, Claim 11, "scoring the sorted" to read as --score the sorted--

Signed and Sealed this
Twenty-fourth Day of September, 2019

Andrei Iancu
*Director of the United States Patent and Trademark Office*